(12) United States Patent
Connaughton et al.

(10) Patent No.: US 12,539,108 B2
(45) Date of Patent: Feb. 3, 2026

(54) MEDICAL DEVICES AND RELATED METHODS

(71) Applicant: Boston Scientific Scimed, Inc., Maple Grove, MN (US)

(72) Inventors: Enda Connaughton, County Galway (IE); Aiden Flanagan, County Galway (IE); Charlene Deane, County Roscommon (IE); Natalie Byrom, Boston, MA (US); Richard Crawford, Galway (IE); Catherine Mary Higgins, Belfast (GB); Martin Lawrence Fawdry, Galway (IE); Michael Hughes, Galway (IE); Anthony O'Brien, Galway (IE); Jason O'Connell, County Galway (IE)

(73) Assignee: Boston Scientific Scimed, Inc., Maple Grove, MN (US)

( * ) Notice: Subject to any disclaimer, the term of this patent is extended or adjusted under 35 U.S.C. 154(b) by 274 days.

(21) Appl. No.: 18/530,353

(22) Filed: Dec. 6, 2023

(65) Prior Publication Data
US 2024/0188946 A1    Jun. 13, 2024

Related U.S. Application Data

(60) Provisional application No. 63/386,373, filed on Dec. 7, 2022.

(51) Int. Cl.
*A61B 17/00* (2006.01)
(52) U.S. Cl.
CPC ............ *A61B 17/00234* (2013.01); *A61B 2017/00336* (2013.01); *A61B 2017/00358* (2013.01)

(58) Field of Classification Search
CPC .......... A61B 17/32056; A61B 17/3207; A61B 17/320708; A61B 2017/320716;
(Continued)

(56) References Cited

U.S. PATENT DOCUMENTS

| 7,008,434 B2 | 3/2006 | Kurz et al. | |
| 2011/0276081 A1* | 11/2011 | Kilemnik | A61F 2/94 606/198 |

(Continued)

OTHER PUBLICATIONS

Bugiantella W, Rondelli F, Boni M, Stella P, Polistena A, Sanguinetti A, et al. Necrotizing pancreatitis: A review of the interventions. International Journal of Surgery. 2016;28:S163-S71.

*Primary Examiner* — Shaun L David
*Assistant Examiner* — Rachael L Geiger
(74) *Attorney, Agent, or Firm* — Bookoff McAndrews, PLLC

(57) ABSTRACT

A medical device includes a handle including a stationary body, a first movable body, and a second movable body; a control member coupled to the second movable body; an intermediate sheath coupled to the first movable body; an external sheath coupled to the stationary body; and an end effector. The end effector includes a first loop and a second loop. The first loop includes a first arm and a second arm, and the first arm is coupled to the intermediate sheath. The second arm is coupled to the control member, and the second arm includes a first plurality of teeth. The second loop includes a third arm and a fourth arm. The third arm is coupled to the intermediate sheath, and the fourth arm is coupled to the control member. The fourth arm includes a second plurality of teeth.

20 Claims, 7 Drawing Sheets

(58) Field of Classification Search
CPC ........... A61B 17/320725; A61B 2017/320733;
A61B 2017/320741; A61B 17/32075;
A61B 2017/32006; A61B 2017/00986;
A61B 2017/00991; A61B 2017/2217
See application file for complete search history.

(56) References Cited

U.S. PATENT DOCUMENTS

| | | | |
|---|---|---|---|
| 2014/0046320 A1* | 2/2014 | Kappel | A61B 18/1492 |
| | | | 606/49 |
| 2016/0287327 A1* | 10/2016 | Badie | A61B 18/148 |
| 2017/0197017 A1 | 7/2017 | Martin | |
| 2019/0282402 A1* | 9/2019 | Clauson | A61F 9/00763 |
| 2020/0178989 A1* | 6/2020 | Avneri | A61B 17/3207 |
| 2020/0345396 A1* | 11/2020 | Rickheim | A61B 17/50 |
| 2021/0393277 A1 | 12/2021 | Vale et al. | |
| 2022/0087666 A1* | 3/2022 | Sharma | A61B 17/29 |

* cited by examiner

MEDICAL DEVICES AND RELATED METHODS

CROSS-REFERENCE TO RELATED APPLICATIONS

This application claims the benefit of priority of U.S. Provisional Patent Application No. 63/386,373, filed Dec. 7, 2022, the entirety of which is incorporated herein by reference.

TECHNICAL FIELD

The present disclosure relates generally to removal or retrieval of tissue or other bodily or foreign materials. More particularly, at least some embodiments of the present disclosure relate to a device for endoscopic removal of materials, such as necrotic tissue, from a body cavity, and related methods of using the device.

BACKGROUND

In the United States, the incidence of pancreatitis is approximately 15,000 cases per year. Necrotizing pancreatitis (NP) is reported to occur in approximately 20% of all episodes of pancreatitis. NP is a health problem in which part of the pancreas dies due to inflammation or injury. Infection of the necrotic tissue can lead to serious complications such as, for example, sepsis or death. Endoscopic necrosectomy may be performed to remove the necrotic tissue in an effort to prevent such complications.

Endoscopic necrosectomy may be performed by passing a flexible endoscope transorally (i.e., through the mouth) and then transmurally (i.e., through a wall of an organ) into the necrotic cavity. Debridement and lavage may then be carried out by a variety of devices, such as, for example one or more snare(s), basket(s), balloon(s), forceps, net(s), and/or irrigation (e.g., through one or more lumens of the flexible endoscope). Multiple insertions/removals of the endoscope and/or devices may be necessary to reach complete debridement. The outcomes of endoscopic necrosectomy are encouraging, but not without limitations and/or challenges.

Current procedures and devices may result in the need for multiple repeated procedures under sedation or anesthesia, which may increase the duration and/or risks of the procedures. Additional challenges include difficulties with quantifying the amount of necrotic tissue, managing a large amount of necrotic tissue, managing deep retroperitoneal extension, and/or treating the distal left side of the pancreas. In some instances, treating the distal left side of the pancreas may be impossible with the existing devices. Moreover, current procedures have technical limits, such as, for example, a lack of dedicated instruments, a difficulty to fix the bowel lumen to the cavity wall with staples or sutures, a difficulty to avoid vital structures (e.g., blood vessels) within the necrotic cavity, among others. These concerns and challenges may increase the duration, costs, and risks of the medical procedure. The devices and methods of this disclosure may rectify some of the deficiencies described above or address other aspects of the art.

SUMMARY

Examples of this disclosure relate to, among other things, devices, and methods for performing one or more medical procedures with the medical devices. Specifically, this disclosure includes medical devices comprising an end effector and methods of use thereof (e.g., methods of delivering the end effector to a treatment site of a patient, for example, to retrieve tissue or other bodily or foreign materials). Each of the examples disclosed herein may include one or more of the features described in connection with any of the other disclosed examples.

According to one aspect, a medical device may comprise a handle a handle including a stationary body, a first movable body, and a second movable body; a control member coupled to the second movable body; an intermediate sheath coupled to the first movable body; an external sheath coupled to the stationary body; and an end effector. The intermediate sheath may include a lumen. The control member may be disposed within the lumen of the intermediate sheath, and the control member may be movable relative to the intermediate sheath. The external sheath may include a lumen, and the intermediate sheath may be disposed within the lumen of the external sheath. The intermediate sheath may be movable relative to the external sheath. The end effector may include a first loop and a second loop. The first loop may include a first arm and a second arm. The first arm may be coupled to the intermediate sheath, and the second arm may be coupled to the control member. The second arm may include a first plurality of teeth, and the second loop may include a third arm and a fourth arm. The third arm may be coupled to the intermediate sheath, and the fourth arm may be coupled to the control member. The fourth arm may include a second plurality of teeth.

The control member may be an internal sheath having a lumen. The first plurality of teeth may be on a distal portion of the second arm, and the second plurality of teeth may be on a distal portion of the fourth arm. In some configurations, the first plurality of teeth may include a plurality of first teeth and a plurality of second teeth. The plurality of first teeth may be arranged at a different angle than the plurality of second teeth. The second plurality of teeth may include a plurality of third teeth and a plurality of fourth teeth. The plurality of third teeth may be arranged at a different angle than the plurality of fourth teeth.

The first plurality of teeth may include a plurality of first teeth and a plurality of second teeth. The plurality of first teeth may have a first height, and the plurality of second teeth may have a second height different than the first height. The second plurality of teeth may include a plurality of third teeth and a plurality of fourth teeth. The plurality of third teeth may have a third height and the plurality of fourth teeth may have a fourth height different than the third height.

The second arm of the first loop and the fourth arm of the second loop may further comprise a plurality of holes. The plurality of holes may be in fluid connection with a lumen extending through a center portion of each of the second arm of the first loop and the fourth arm of the second loop. Each of the first loop and the second loop may be formed of a shape-memory material. Each of the first loop and second loop may be collapsible within the external sheath.

First movable body may be movably positioned within a slot on the stationary body. The second movable body may be movably positioned within a slot on the first movable body. The end effector further may comprise a third loop coupled to the first loop at a first joint, and a fourth loop coupled to the second loop at a second joint. The third loop may include a fifth arm and a sixth arm, and the fourth loop may include a seventh arm and an eighth arm. The sixth arm of the third loop may include a plurality of third teeth, and the eighth arm of the fourth loop may include a plurality of fourth teeth. Fifth arm of the third loop may be coupled to the intermediate sheath, and the sixth arm of the third loop may be coupled to the control member. The seventh arm of the fourth loop may be coupled to the intermediate sheath, and the eighth arm of the fourth loop may be coupled to the control member. In some configurations, each of the first loop, the second loop, the third loop, and the fourth loop may be formed of a shape-memory material. Each of the first loop, the second loop, the third loop, and the fourth loop may be collapsible within the external sheath.

The end effector further may comprise a third loop and a fourth loop. The third loop may be coupled to the first loop by a first wire. The fourth loop may be coupled to the second loop by a second wire. The third loop may include a fifth arm and a sixth arm. The fourth loop may include a seventh arm and an eighth arm. The sixth arm of the third loop may include a plurality of third teeth. The sixth arm of the fourth loop may include a plurality of fourth teeth. The first wire may include a plurality of fifth teeth. The second wire may include a plurality of sixth teeth. Each of the first loop, the second loop, the third loop, the fourth loop, the first wire, and the second wire may be formed of a shape-memory material. Each of the first loop, the second loop, the third loop, the fourth loop, the first wire, and the second wire may be collapsible within the external sheath.

In a first configuration, a distal end of the control member may be distal to a distal end of the intermediate sheath, a distal end of the intermediate sheath may be distal to a distal end of the external sheath, and the first loop and the second loop may be spaced a first distance apart. In a second configuration, the distal end of the control member may be proximal to the distal end of the intermediate sheath, the distal end of the intermediate sheath may be distal to the distal end of the external sheath, and the first loop and the second loop may be spaced a second distance apart. The second distance may be less than the first distance. In a third configuration, the distal end of the control member may be proximal to the distal end of the intermediate sheath, the distal end of the intermediate sheath may be distal to the distal end of the control member and proximal to the distal end of the external sheath, and the first loop and the second loop may be spaced a third distance apart. The third distance may be less than the second distance.

According to an alternative aspect, a medical device may comprise a handle including a stationary body, a first movable body, and a second movable body; a first sheath coupled to the second movable body; a second sheath coupled to the first movable body; a third sheath coupled to the stationary body; and an end effector. The first sheath may be disposed within a lumen of the second sheath, and the first sheath may be movable relative to the second sheath. The second sheath may be disposed within a lumen of the third sheath, and the second sheath may be movable relative to the third sheath.

The end effector may include a first loop and a second loop. A first proximal end of the first loop may be coupled to the first sheath. A second proximal end of the first loop may be coupled to the second sheath. At least a portion of the first loop may include a first plurality of teeth extending radially inward. A first proximal end of the second loop may be coupled to the first sheath. A second proximal end of the second loop may be coupled to the second sheath. At least a portion of the second loop may include a second plurality of teeth extending inward. Distal movement of the first movable body may extend a first portion of the first loop and a first portion of the second loop. Proximal movement of the first movable body may retract the first portion of the first loop and the first portion of the second loop. Distal movement of the second movable body may extend a second portion of the first loop and a second portion of the second loop. Proximal movement of the second movable body may retract the second portion of the first loop and the second portion of the second loop.

The first plurality of teeth may include a plurality of first teeth and a plurality of second teeth. The plurality of first teeth may be arranged at a different angle than the plurality of second teeth, and the second plurality of teeth may include a plurality of third teeth and a plurality of fourth teeth. The plurality of third teeth may be arranged at a different angle than the plurality of fourth teeth.

In some configurations, the plurality of first teeth may have a first height, and the plurality of second teeth may have a second height different than the first height. The second plurality of teeth may include a plurality of third teeth and a plurality of fourth teeth. The plurality of third teeth may have a third height, and the plurality of fourth teeth may have a fourth height different than the third height.

According to an alternative aspect, an end effector may comprise a first sheath; a second sheath; a third sheath; a first loop; and a second loop. The first sheath may be disposed within a lumen of the second sheath, and the first sheath may be movable relative to the second sheath. The second sheath may be disposed within a lumen of the third sheath, and the second sheath may be movable relative to the third sheath. The first loop may include a first arm and a second arm. The first arm of the first loop may be coupled to the second sheath. The second arm of the first loop may be coupled to the first sheath. The second arm may include a first plurality of teeth. The second loop may include a first arm and a second arm. The first arm of the second loop may be coupled to the second sheath. The second arm of the second loop may be coupled to the first sheath. The second arm may include a second plurality of teeth. Each tooth of the first plurality of teeth and each tooth of the second plurality of teeth may be equally spaced from an adjacent tooth.

The end effector may further comprise a third loop coupled to the first loop at a first joint, and a fourth loop coupled to the second loop at a second joint. The third loop and the fourth loop may each be comprised of a first arm and a second arm. The second arm of the third loop may include a plurality of third teeth. The second arm of the fourth loop may include a fourth plurality of teeth.

Any of the examples described herein may have any of these features in any combination.

BRIEF DESCRIPTION OF THE DRAWINGS

The accompanying drawings, which are incorporated in and constitute a part of this specification, illustrate exemplary aspects of the disclosure and together with the description, serve to explain the principles of the disclosure.

DETAILED DESCRIPTION

Reference will now be made in detail to aspects of the present disclosure, examples of which are illustrated in the accompanying drawings. Wherever possible, the same or similar reference numbers will be used through the drawings to refer to the same or like parts. The term "distal" refers to a portion farthest away from a user when introducing a device into a subject (e.g., patient). By contrast, the term "proximal" refers to a portion closest to the user when placing the device into the subject.

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of +10% in a stated value or characteristic.

Although the treatment site is discussed herein as being in the subject's GI tract, this disclosure is not so limited, as the treatment site may be any internal lumen, organ, cavity, or other tissue within the subject. Additionally, although endoscopes are referenced herein, it will be appreciated that the disclosure encompasses any medical devices having a working channel extending from a proximal end to a distal end, such as ureteroscopes, duodenoscopes, gastroscopes, endoscopic ultrasonography ("EUS") scopes, colonoscopes, bronchoscopes, laparoscopes, arthroscopes, cystoscopes, aspiration scopes, sheaths, or catheters.

Embodiments of the disclosure may address one or more of the limitations in the art. The scope of the disclosure, however, is defined by the attached claims and not the ability to solve a specific problem. The present disclosure is drawn to devices, systems, and related methods, for a tissue removing medical device, among other aspects. It is noted that various embodiments of said medical device may also be used for food impaction, removal of other bodily material, or any foreign body retrieval.

Figure 1A:
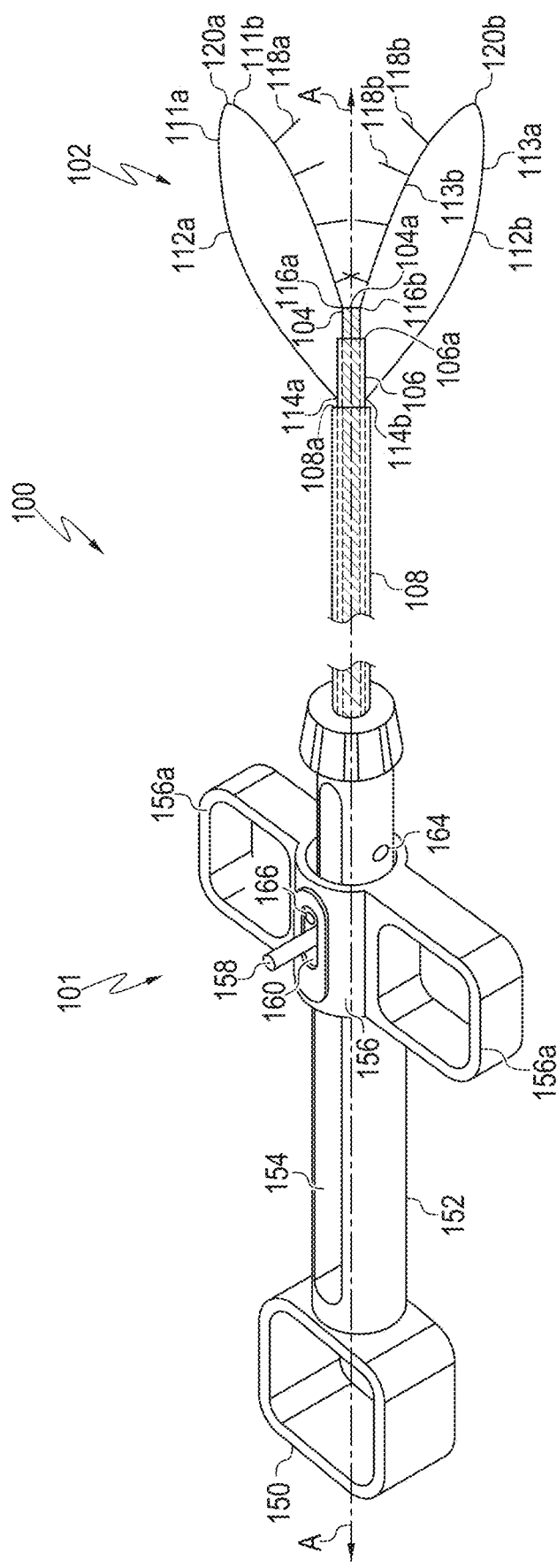
FIG. 1A is a perspective view of a medical device in a first configuration, according to aspects of this disclosure.

FIG. 1A illustrates a medical device 100 having a handle 101 and a distal portion 102. FIG. 1A is not to scale, for example, with distal portion 102 enlarged to better illustrate details described below. Distal portion 102 is shown in a first, or open, configuration. Portions of distal portion 102 are movable to facilitate, for example, capturing and/or removing tissue or other object(s). For example, movement of an internal, or first, sheath 104 and/or an intermediate, or second, sheath 106 relative to an external, or third, sheath 108 may result in the extension, expansion, or opening, and/or the retraction, compression, or closing of portions of distal portion 102, for example, a first loop 112a and a second loop 112b. Additionally, first loop 112a and second loop 112b may include a plurality of first teeth 118a and a plurality of second teeth 118b extending radially inwards, for example, towards a longitudinal axis A. Each of the plurality of first teeth 118a and plurality of second teeth 118b are to be described in further detail below.

Handle 101 may include a first movable body 156 and a stationary body 152. For example, movement of first movable body 156 relative to stationary body 152 may control the movement (e.g., extension or retraction) of a portion of distal portion 102. For example, an intermediate sheath 106 of distal portion 102 may be coupled to first movable body 156, and thus first movable body 156 may control the movement (e.g., extension or retraction) of one or more portions of distal portion 102. Intermediate sheath 106 may be coupled (e.g., directly or indirectly) or otherwise connected to first movable body 156 via, for example, an adhesive, a mechanical fit, a snap fit, a press fit, a weld, or any other coupling techniques commonly known in the art. Similarly, external sheath 108 may be coupled (e.g., directly or indirectly) or otherwise connected to first stationary body 152 via, for example, an adhesive, a mechanical fit, a snap fit, a press fit, a weld, or any other coupling techniques commonly known in the art.

First movable body 156 may partially surround a portion of stationary body 152, and a portion of first movable body 156 may at least partially extend into a handle slot 154. Handle slot 154 may extend longitudinally through at least a portion of stationary body 152 of handle 101. In some aspects, although not shown, handle 101 may include one or more biasing elements (e.g., one or more springs), for example, such that distal movement of first movable body 156 relative to stationary body 152 is biased proximally. In these aspects, when the user releases a distal pressure or force on first movable body 156, the one or more biasing elements may bias first movable body 156 proximally.

First movable body 156 may include one or more finger holes 156a extending radially outward from first movable body 156. Accordingly, movement of the user's fingers (i.e., relative to the user's thumb in a finger ring 150 in stationary body 152) may control the position of first movable body 156 relative to stationary body 152, and thus the movement of intermediate sheath 106 and/or one or more portions of distal portion 102.

Handle 101 may also include a second movable body 158, for example, movably mounted on or otherwise coupled to first movable body 156. Movement of second movable body 158 relative to first movable body 156 may control the movement (e.g., extension or retraction) of an internal sheath 104 of distal portion 102, for example. At least a portion of second movable body 158 may be coupled to (e.g., directly or indirectly) or otherwise connected to internal sheath 104 via, for example, an adhesive, a mechanical fit, a snap fit, a press fit, a weld, or any other coupling techniques commonly known in the art. Accordingly, movement of second movable body 158 may control the movement (e.g., extension or retraction) of internal sheath 104 and thus one or more portions of distal portion 102.

A portion of second movable body 158 may at least partially extend into a handle slot 160. Handle slot 160 may extend longitudinally through at least a portion of first movable body 156 of handle 101. In some aspects, although not shown, one or more portions of handle 101 (e.g., first movable body 156 or second movable body 158) may include one or more biasing elements (e.g., one or more springs), for example, such that distal movement of second movable body 158 relative to first movable body 156 is biased proximally. In these aspects, when the user releases a distal pressure or force on second movable body 158, the one or more biasing elements may bias second movable body 158 proximally.

Stationary body 152, first movable body 156, and/or second movable body 158 may include one or more visual or physical indicator(s) 164. The indicator(s) may include, for example, indentations, raised surfaces, markings, etc. The indicator(s) may physically or visually indicate the actuation or extension of distal portion 102. For example, as first movable body 156 is advanced distally relative to stationary body 152, thus actuating at least a first portion (e.g., intermediate sheath 106) of distal portion 102, first movable body 156 may have to overcome, for example, the indicator(s) 164 on stationary body 152. The indicator(s) 164 on stationary body 152 may signal to the user that the first portion of distal portion 102 has been actuated, or is in an extended position. In alternative configurations indicator(s) 164 may form a lock, for example, a hole to receive a radially-inward extending peg on first movable body 156 to assist in securing first movable body 156 in a distal position.

Similarly, as second movable body 158 is advanced distally relative to first movable body 156, thus actuating at least a second portion of distal portion 102, second movable body 158 may have to overcome, for example, one or more indicator(s) 166 on first movable body 156. Indicator(s) 166 may signal to the user that a second portion distal portion 102 has been actuated, or is in an extended position. Additionally or alternatively, the user may utilize markings on handle 101 or other visual indicators to determine a status, position, actuation status, etc. of one or more portions of distal portion 102.

Still referring to FIG. 1A, distal portion 102 may be an end effector that includes internal sheath 104, intermediate sheath 106, and an external sheath 108. In some configurations, internal sheath 104 may be a control member. For example, internal sheath 104 may be comprised of a wire or a cable. In alternative configurations, internal sheath 104, intermediate sheath 106, and external sheath 108 may each be formed by a coil, a tube, a sheath, etc., and may have an internal lumen (not shown) extending longitudinally, for example, along a longitudinal axis A. For example, an internal lumen of external sheath 108 may be sized and shaped to movably receive intermediate sheath 106 (e.g., intermediate sheath 106 may be disposed within external sheath 108). Similarly, an internal lumen of intermediate sheath 106 may be sized and shaped to movably receive internal sheath 104 (e.g., internal sheath 104 may be disposed within intermediate sheath 106). An internal lumen of internal sheath 104 may be sized and shaped to receive additional auxiliary devices (e.g., a guidewire, a basket, a grasper, forceps, etc.), for example, through a port (not shown) on handle 101. Additionally or alternatively, internal lumen of internal sheath 104 may be used for suction, irrigation, and/or insufflation, for example, with a source of suction, irrigation, and/or insufflation coupled to the port (not shown) on handle 101. In alternative configurations, internal sheath 104 may be formed of a wire or a solid sheath, for example, without an internal lumen.

Each of internal sheath 104 and intermediate sheath 106 may be moveable relative to one another and to external sheath 108. For example, in some embodiments, internal sheath 104 may be independently movable relative to intermediate sheath 106, and intermediate sheath 106 may be independently movable relative to external sheath 108. As previously described, a proximal portion of internal sheath 104 may be coupled to one or more portions of handle 101, for example, to second movable body 158. Similarly, a proximal portion of intermediate sheath 106 may be coupled to one or more different portions of the handle 101, for example, to first movable body 156.

Distal portion 102 further comprises first loop 112a and second loop 112b, respectively. Each of first loop 112a and second loop 112b may be a wire, a tube, a coil, a ribbon, etc. Additionally, first loop 112a and second loop 112b may be formed of one or more flexible or semi-flexible materials, for example, including expandable and/or shape-memory characteristics, such as, for example, plastic, Nitinol, Nickel-cobalt, stainless steel, or any material(s) commonly known in the art. First loop 112a and second loop 112b may be formed of the same shape and/or material or may be formed of different shapes and/or materials. For example, first loop 112a may be a tube formed of plastic and second loop 112b may be a wire formed of Nitinol, or vice versa. Many other combinations are also contemplated. First loop 112a and second loop 112b may be formed in a same plane, for example a plane perpendicular to longitudinal axis A. Additionally or alternatively, first loop 112a and second loop 112b may be mirror images of one another about longitudinal axis A. For example, first loop 112a may be the same size and shape as second loop 112b. Alternatively, first loop 112a may be bigger or larger than second loop 112b, or vice versa.

First loop 112a may further comprise a first arm 111a and a second arm 111b. First arm 111a may form an outer edge or portion of first loop 112a and second arm 111b may form an inner edge or portion of first loop 112a, for example, relative to longitudinal axis A. First arm 111a and second arm 111b of first loop 112a may be comprised of the same material or may be comprised of different materials. For example, first arm 111a and second arm 111b may be comprised of a continuous wire, coil, tube, or sheath. Alternatively, first arm 111a and second arm 111b may be at least two separate wires, tubes, coils, or sheaths. In such a configuration, first arm 111a and second arm 111b may be coupled or otherwise meet at a first distalmost end 120a.

Similarly, second loop 112b may further comprise a first arm 113a and a second arm 113b. First arm 113a may form an outer edge or portion of second loop 112b and second arm 113b may form an inner edge or portion of second loop 112b. First arm 113a and second arm 113b of second loop 112b may be comprised of the same material or may be comprised of different materials. For example, first arm 113a and second arm 113b may be comprised of a continuous wire, tube, coil, or sheath. Alternatively, first arm 113a and second arm 113b may be at least two separate wires, tubes, coils, or sheaths. In such a configuration, first arm 113a and second arm 113b may be coupled or otherwise meet at a second distalmost end 120b.

Proximal ends of first arm 113a of first loop 112a and first arm 113a of second loop 112b may be fixedly coupled to an external surface of intermediate sheath 106, for example, at a first proximal coupling joint 114a and a second proximal coupling joint 114b, respectively. One or more crimp(s), adhesive(s), heat shrink(s), weld(s), or any other securing mechanism commonly known in the art may help to form first proximal coupling joint 114a and/or second proximal coupling joint 114b. In some configurations, first arm 111a of first loop 112a and first arm 113a of second loop 112b may terminate at first proximal coupling joint 114a and second proximal coupling joint 114b, respectively. Alternatively, first arm 111a of first loop 112a and first arm 113a of second loop 112b may be secured or coupled to intermediate sheath 106 and continue to extend proximally (e.g., radially between intermediate sheath 106 and external sheath 108).

For example, first arm 111a of first loop 112a and first arm 113a of second loop 112b may extend into and/or may be coupled to one or more portions of handle 101, for example, to a portion of first movable body 156.

In further alternative configurations, first arm 111a of first loop 112a and first arm 113a of second loop 112b may continue to extend proximally such that a proximal end of each of first arm 111a of first loop 112a and first arm 113a of second loop 112b are coupled to one or more portions of handle 101, for example, to a portion of first movable body 156. In such a configuration, intermediate sheath 106 may be omitted. For example, first arm 111a and first arm 113a may extend between internal sheath 104 and external sheath 108.

Figure 1B:
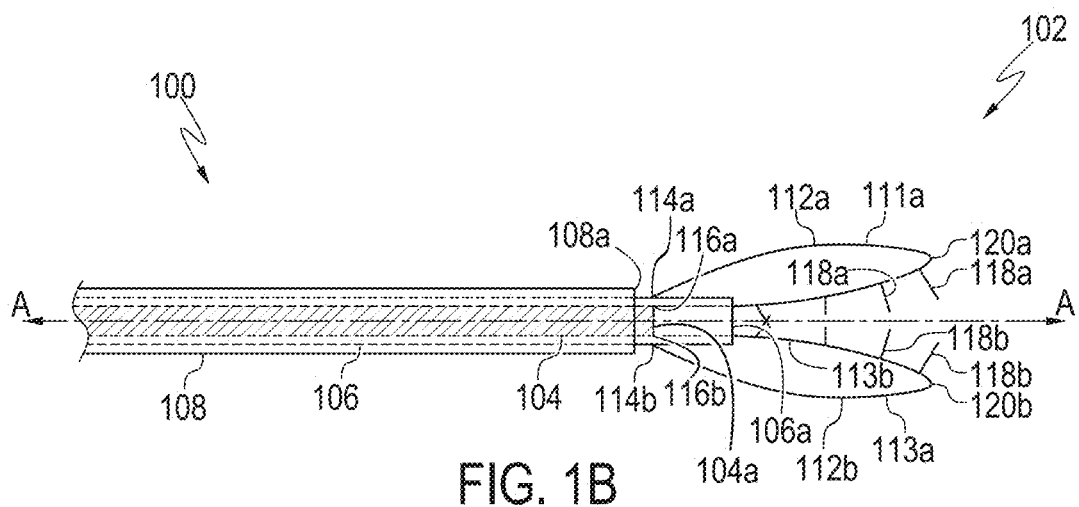
FIG. 1B is a side view of a distal portion of the medical device of FIG. 1A in a second configuration, according to aspects of this disclosure.
Figure 1C:
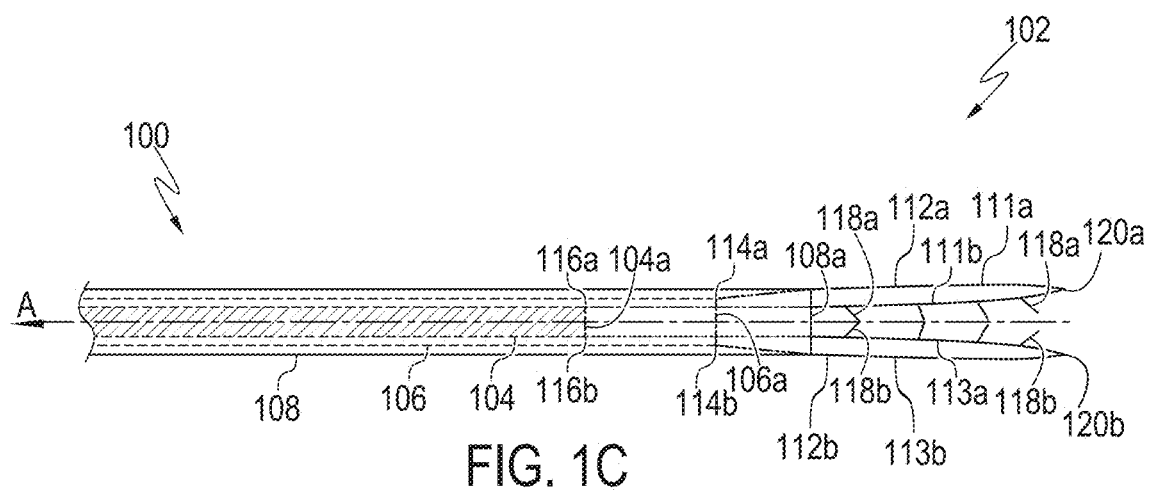
FIG. 1C is a side view of the distal portion of the medical device of FIG. 1A in a third configuration, according to aspects of this disclosure.

As shown in FIGS. 1A-1C, first proximal coupling joint 114a and second proximal coupling joint 114b may be proximate to a distal end 106a of intermediate sheath 106. In alternative configurations (not shown), first proximal coupling joint 114a and second proximal coupling joint 114b may be adjacent to distal end 106a of intermediate sheath 106. Alternatively or alternatively, first proximal coupling joint 114a and second proximal coupling joint 114b may be internal of intermediate sheath 106. For example, first proximal coupling joint 114a and second proximal coupling joint 114b may be coupled to an internal surface (not shown) of intermediate sheath 106.

Second arm 111b of first loop 112a and second arm 113b of second loop 112b may be coupled to an external surface of internal sheath 104, for example, at a first distal coupling joint 116a and a second distal coupling joint 116b, respectively. One or more crimp(s), adhesive(s), heat shrink(s), weld(s), or any other securing mechanism commonly known in the art may form first distal coupling joint 116a and/or second distal coupling joint 116b. In some configurations, second arm 111b of first loop 112a and second arm 113b of second loop 112b may terminate at first distal coupling joint 116a and second distal coupling joint 116b, respectively. Alternatively, second arm 111b of first loop 112a and second arm 113b of second loop 112b may be secured or coupled to internal sheath 104 and continue to extend proximally, for example, along a length of internal sheath 104. For example, second arm 111b of first loop 112a and second arm 113b of second loop 112b may extend into and/or couple to one or more portion(s) of handle 101, for example, to second movable body 158.

In further alternative configurations, second arm 111b of first loop 112a and second arm 113b of second loop 112b may continue to extend proximally such that a proximal end of each of second arm 111b of first loop 112a and second arm 113b of second loop 112b are coupled to one or more portions of handle 101, for example, to a portion of first movable body 156. In such a configuration, internal sheath 104 may be omitted.

First distal coupling joint 116a and second distal coupling joint 116b may be adjacent to distal end 104a of internal sheath 104 (e.g., on distal end 104a). In alternative configurations (not shown), first distal coupling joint 116a and second distal coupling joint 116b may be proximal to distal end 104a of internal sheath 104. Alternatively, first distal coupling joint 116a and second distal coupling joint 116b may be internal to internal sheath 104. For example, first distal coupling joint 116a and second distal coupling joint 116b may be coupled to an internal surface (not shown) of internal sheath 104.

At least a portion of each of second arm 111b of first loop 112a and second arm 113b of second loop 112b may comprise a plurality of first teeth 118a and a plurality of second teeth 118b, respectively, extending radially inwards, for example, towards longitudinal axis A. The plurality of first teeth 118a may extend along a length of second arm 111b of first loop 112a, for example, between first distal coupling joint 116a and first distalmost end 120a of first loop 112a. Similarly, the plurality of second teeth 118b may extend along a length of second arm 113b of second loop 112b, for example, between second distal coupling joint 116b and second distalmost end 120b of second loop 112b. In alternative configurations, the plurality of first teeth 118a and the plurality of second teeth 118b may extend further along a length of first loop 112a and second loop 112b, for example, beyond first distalmost end 120a and second distalmost end 120b (e.g., from one or more portions of first arm 111a of first loop 112a and first arm 113a of second loop 112b).

Adjacent teeth comprising each of the plurality of first teeth 118a and the plurality of second teeth 118b may be spaced apart. For example, the spacing between each of the teeth comprising each of the plurality of first teeth 118a and the plurality of second teeth 118b may be the same, or consistent. In alternative configurations, the spacing may be irregular. For example, the teeth comprising the first plurality of teeth 118a and/or the teeth comprising the second plurality of teeth 118b may be closer together on a distal end of second arm 111b and second arm 113b, respectively, than a proximal end of second arm 111b and second arm 113b.

The plurality of first teeth 118a and the plurality of second teeth 118b may be shaped or formed to facilitate grasping tissue or other bodily or foreign materials. The plurality of first teeth 118a and the plurality of second teeth 118b may be formed of a flexible or semi-flexible material. Alternatively, the plurality of first teeth 118a and the plurality of second teeth 118b may be formed of a stiff, or rigid, material. The plurality of first teeth 118a and the plurality of second teeth 118b may be comprised of the same material comprising each of second arm 111b of first loop 112a and second arm 113b of second loop 112b, or the plurality of first teeth 118a and the plurality of second teeth 118b may be comprised of a different material. FIGS. 2A-2E, to be described in further detail below, illustrate a variety of configurations for each of the plurality of first teeth 118a and the plurality of second teeth 118b.

FIG. 1A shows distal portion 102 of medical device 100 in a first (e.g., extended and/or open) configuration. In this first configuration, distal end 104a of internal sheath 104 may be distal to distal end 106a of intermediate sheath 106. Additionally, distal end 106a of intermediate sheath 106 may be distal to a distal end 108a of external sheath 108. For example, in the first configuration, at least a portion of distal portion 102 may no longer be confined by external sheath 108. Accordingly, each of first loop 112a and second loop 112b may push radially outward, or radially away from longitudinal axis A.

The user may position distal portion 102 in the first configuration shown in FIG. 1A, for example, by extending first movable body 156 and second movable body 158 distally. Accordingly, in these aspects, when first movable body 158 is moved proximally or distally, internal sheath 104 is moved or otherwise urged proximally or distally, respectively, relative to intermediate sheath 106. Additionally or alternatively, a user may manipulate first movable body 156 to extend or retract intermediate sheath 106 relative to external sheath 108. For example, when intermediate sheath 106 is extended distally, internal sheath 104 may be extended and/or retracted such that the plurality of first teeth 118a and the plurality of second teeth 118b move towards one another or away from one another, for example, towards longitudinal axis A or away from longitudinal axis A. This movement may help distal portion 102 to grasp on to and/or hold tissue or other bodily or foreign materials between first loop 112a and second loop 112b. In some configurations, internal sheath 104 may be retracted proximally such that distal end 104a of internal sheath 104 is proximal to distal end 106a of intermediate sheath 106. This configuration may enable a firmer or more secure grip on the grasped tissue or other bodily or foreign materials. For example, as internal sheath 104 is retracted proximally, the plurality of first teeth 118a and the plurality of second teeth 118b move toward each other (e.g., toward longitudinal axis A) to form or facilitate a more secure grip on the tissue or other bodily or foreign materials.

FIG. 1B shows distal portion 102 of medical device 100 in a second, or partially closed, configuration. In this configuration, second movable body 158 may be at least partially retracted proximally. Additionally or alternatively, second movable body 158 may be spring biased in a proximal position. Accordingly, internal sheath 104 is retracted proximally. For example, in this configuration, distal end 104a of internal sheath 104 is proximal to distal end 106a of intermediate sheath 106. In some configurations, distal end 108a of external sheath 108 may be proximal to distal end 104a of internal sheath 104. Although not shown, in alternative configurations, internal sheath 104 may be retracted proximally such that distal end 104a of internal sheath 104 is proximal to distal end 108a of external sheath 108.

When internal sheath 104 is retracted proximally, first loop 112a and second loop 112b are biased towards longitudinal axis A. Additionally, first loop 112a and second loop 112b may decrease in size or, for example, may be compressed. For example, a width (e.g., extending radially away from longitudinal axis A) of each of first loop 112a and second loop 112b may decrease. As the width of each of first loop 112a and second loop 112b decreases, the length (e.g., parallel to longitudinal axis A) of each of first loop 112a and second loop 112b may increase. Additionally, as first loop 112a and second loop 112b are biased towards longitudinal axis A, the plurality of first teeth 118a and the plurality of second teeth 118b, respectively, may begin to abut, overlap, and/or crisscross. As the plurality of first teeth 118a and the plurality of second teeth 118b are biased towards longitudinal axis A, the user may be able to more securely or firmly grip to the grasped tissue or other bodily or foreign materials.

FIG. 1C shows distal portion 102 of medical device 100 in a third, or closed, configuration. In this configuration, first movable body 156 may be retracted proximally and/or second movable body 158 may be retracted more or further proximally. For example, first movable body 156 may be in a more proximal position in the first configuration than in the second configuration and/or second movable body 158 may be in a more proximal position in the first configuration than in the second configuration. Accordingly, intermediate sheath 106 and internal sheath 104 are retracted proximally. For example, in this configuration, distal end 106a of intermediate sheath 106 is proximal to distal end 108a of external sheath 108, as compared to the second configuration shown in FIG. 1B. Additionally, in the third configuration, distal end 104a of internal sheath 104 may be proximal to distal end 106a of intermediate sheath 106 and distal end 108a of external sheath 108. Accordingly, distal portion 102 may be retracted proximally within external sheath 108.

As distal portion 102 is retracted proximally within external sheath 108, first loop 112a and second loop 112b may further decrease in size or, for example, may be more compressed, such that each of first loop 112a and second loop 112b may be encompassed, or fit within, external sheath 108. For example, a width (e.g., extending radially away from longitudinal axis A) of each of first loop 112a and second loop 112b may decrease.

As the width of each of first loop 112a and second loop 112b decreased, a length (e.g., parallel to longitudinal axis A) of each of the first loop 112a and second loop 112b may increase. In other words, first loop 112a and second loop 112b may be collapsible, for example, within external sheath 108. Similarly, as the plurality of first teeth 118a and the plurality of second teeth 118b are more biased towards longitudinal axis A, the user may be able to more securely or firmly grip to the grasped tissue or other bodily or foreign materials. For example, the plurality of first teeth 118a and the plurality of second teeth 118b may overlap to a greater extent than in the second configuration. For example, only the proximal teeth of the plurality of first teeth 118a and the plurality of second teeth 118b may overlap in FIG. 1B. This is compared to FIG. 1C, where more distal teeth of the plurality of first teeth 118a and the plurality of second teeth 118b may abut, overlap, crisscross, etc.

Aspects of this disclosure include methods of using the embodiment illustrated in FIGS. 1A-1C. A user may deliver medical device 100 into the body of a subject, for example, via a natural orifice (such as a mouth or anus) and through a tortuous natural body lumen of the subject (such as an esophagus, stomach, colon, etc.). Medical device 100 may be delivered in any suitable way, for example, through a working lumen of an endoscope. Medical device 100 may be delivered into the body in a retracted position (not shown). In the retracted position, for example, internal sheath 104, intermediate sheath 106, first loop 112a, and second loop 112b may be positioned proximally within external sheath 108 such that first distalmost end 120a and second distalmost end 120b may be proximal of or adjacent to distal end 108a of external sheath 108. In this configuration, for example, first movable body 156 of handle 101 may be in a proximalmost position within handle slot 154 and second movable body 158 of handle 101 may be in a proximalmost position within handle slot 160.

A user may direct medical device 100 to an intended target site by various techniques, including imaging. For example, the imaging may be accomplished using the endoscope, x-ray, fluoroscopy, or any other imaging device commonly used in the art. The endoscope may also include one or more deflectable portions, for example, to help with delivering distal portion 102 to the target site.

Once a target site is reached, a user may position medical device 100 including distal portion 102, such that distal portion 102 is adjacent to and/or facing the tissue or other object that is targeted for removal. When delivering medical device 100 to the target site, distal portion 102 may be in a fully retracted, or closed position (not shown). For example, in the fully retracted position, distalmost end 120a of first loop 112a and distalmost end 120b of second loop 112b may be proximal to distal end 108a of external sheath 108. A user may then extend or position distal portion 102, for example, to the first configuration shown in FIG. 1A. For example, the user may distally advance first movable body 156 to extend intermediate sheath 106 and/or internal sheath 104, such that distal portion 102 is in the first configuration, as shown in FIG. 1A. In the first configuration, each of the first loop 112a and the second loop 112b may be spaced by a first distance.

A user may then grasp or surround the targeted tissue or object by retracting internal sheath 104 and/or intermediate sheath 106 such that first loop 112a and second loop 112b are biased towards longitudinal axis A, as shown in FIGS. 1B and 1C. For example, in the second configuration (shown in FIG. 1B), each of the first loop 112a and the second loop 112b may be a spaced by a second distance, wherein the second distance is less than the first distance. In the third configuration (shown in FIG. 1C), each of the first loop 112a and the second loop 112b may be spaced by a third distance, wherein the third distance is less than the second distance. Accordingly, the targeted tissue or object may be grasped, or otherwise surrounded, between first loop 112a and second loop 112b, for example, between each of the plurality of first teeth 118a and the plurality of second teeth 118b. As a result, the targeted tissue or object may be fragmented, dislodged, removed, or held between first loop 112a and second loop 112b, for example, between each of the plurality of first teeth 118a and the plurality of second teeth 118b.

A user may also deliver a fluid (e.g. saline) through internal sheath 104 of medical device 100, via a connection to an additional port (not shown) at a distal end of handle 101. After obtaining the targeted tissue or object, a user may direct distal portion 102, for example, by retracting the endoscope or retracting medical device 100 proximally to an appropriate site (e.g., the stomach) for dispensing the tissue or object, and dispense the tissue or object. The tissue or object may be released from between first loop 112a and second loop 112b by, for example, extending internal sheath 104 and/or intermediate sheath 106 distally. For example, distal portion 102 may be returned to the first configuration shown in FIG. 1A to release the tissue or object.

In some configurations, first movable body may be configured to move even further distally, for example, beyond physical indicator(s) 164, to even further open distal portion 102 to release the tissue or object. In alternative examples, the tissue or object may be dispensed by retracting first loop 112a and second loop 112b and internal sheath 104 into intermediate sheath 106 and/or intermediate sheath 106 into external sheath 108, so that first loop 112a and second loop 112b may at least partially cut through the held tissue or object and eject said tissue or object from between first loop 112a and second loop 112b. In other examples, the tissue or object may be held between first loop 112a and second loop 112b, and distal portion 102 may be retracted out of a patient's body (e.g., through a lumen of the delivery endoscope or together with the delivery endoscope) altogether to remove said tissue or object. In alternative examples, tissue or object may be removed via suction applied through a channel (e.g., an aspiration channel) of an endoscope (e.g., the delivery endoscope or a separate endoscope). Thus, a user (e.g., a physician) may be able to orient medical device 100, safely grab the tissue or object, remove the tissue or object via any method or mechanism, including those described above, and repeat this sequence with a low likelihood of medical device 100 becoming obstructed by material, misshapen, or breaking during a procedure.

FIGS. 2A-2E illustrate perspective views of respective portions 212A, 212B, 212C, 212D, 212E of first loop 112a and/or second loop 112b, according to aspects of this disclosure. For example, one or more portions of first loop 112a and/or second loop 112b may be comprised of one or more of portions 212A, 212B, 212C, 212D, 212E, shown in FIGS. 2A-2E. For example, one or more portions of first loop 112a may comprise the characteristics of portion 212A shown in FIG. 2A, and one or more portions of second loop 112b may comprise the characteristics of portion 212C shown in FIG. 2C, or vice versa. Many other combinations are also contemplated.

Figure 2A:
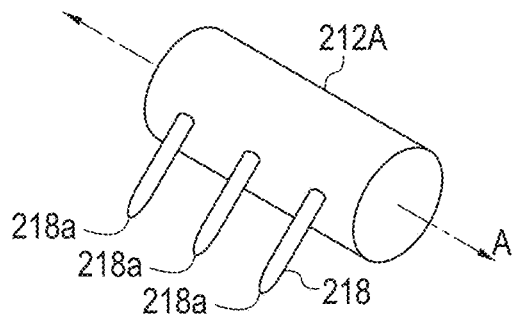
FIGS. 2A-2E illustrate perspective views of different portions of the distal portion of the medical device shown in FIGS. 1A-1C, according to aspects of this disclosure.

FIG. 2A illustrates a portion 212A of second arm 111b of first loop 112a and/or second arm 113b of second loop 112b shown in FIGS. 1A-1C having, for example, a plurality of extensions or teeth 218 extending radially out of portion 212A. Teeth 218 may terminate at a sharp point 218a. In some configurations, teeth 218 may be spaced evenly. For example, there may be an equal amount of distance between each of the plurality of teeth 218. In alternative configurations, teeth 218 may be unevenly, or sporadically spaced. For example, there may be an unequal and varying amount of distance between each of the plurality of teeth 218. Additionally or alternatively, the number of teeth 218 may be greater at a distal end and/or a proximal end. For example, there may be a greater concentration of teeth 218 at a distal end and/or proximal end of second arm 111b of first loop 112a and/or second arm 113b of second loop 112b. In some configurations, teeth 218 may form a perpendicular angle relative to longitudinal axis A extending longitudinally through a center of portion 212A. Alternatively, one or more of teeth 218 may form an acute or an obtuse angle relative to longitudinal axis A. For example, teeth 218 may alternate directions (e.g., into or out of the page).

Figure 2B:
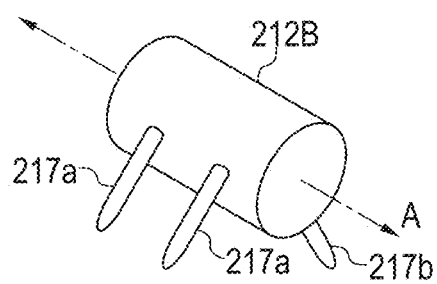

FIG. 2B illustrates a portion 212B of second arm 113b of first loop 112a and/or second arm 111b of second loop 112b shown in FIGS. 1A-1C having, for example, a first plurality of extensions or teeth 217a and a second plurality of extensions or teeth 217b, each extending radially out of portion 212B. In some configurations, the plurality of first teeth 217a may be arranged to form a perpendicular angle relative to the plurality of second teeth 217b. Alternatively, the plurality of first teeth 217a may be arranged to form an acute or an obtuse angle relative to the plurality of second teeth 217b.

Similar to teeth 218 of FIG. 2A, each of first teeth 217a and second teeth 217b may terminate at a sharp point. Each of the teeth forming first teeth 217a and second teeth 217b may be spaced evenly. For example, there may be an equal amount of space between each of the plurality of first teeth 217a. Similarly, there may be an equal amount of space between each of the plurality of second teeth 217b. Alternatively, the distance between each of the plurality of first teeth 217a and the plurality of second teeth 217b may differ. For example, the distance between each of the plurality of first teeth 217a may be a first distance, and the distance between each of the plurality of second teeth 217b may be a second distance, different from the first distance. In alternative configurations, the plurality of first teeth 217a and the plurality of second teeth 217b may be unevenly, or sporadically spaced. For example, there may be an unequal and varying amount of space between each of the plurality of first teeth 217a and between each of the plurality of second teeth 217b.

Figure 2C:
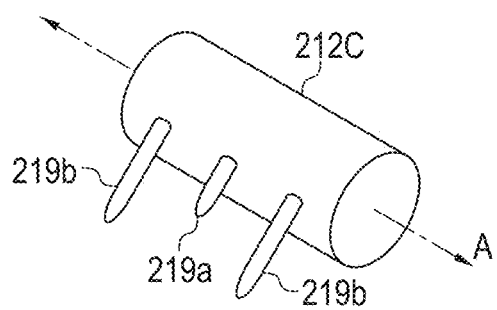

FIG. 2C illustrates a portion 212C of second arm 113b of first loop 112a and/or second arm 111b of second loop 112b shown in FIGS. 1A-1C having, for example, a first plurality of extensions or teeth 219a and a second plurality of extensions or second teeth 219b extending radially out of portion 212C. Although only one tooth of second teeth 219b is shown, it is noted that this configuration may comprise more than one tooth of second teeth 219b. The plurality of first teeth 219a and plurality of second teeth 219b may have any of the characteristics of teeth 218 and/or the plurality of first teeth 217a and the plurality of second teeth 217b described in FIGS. 2A and 2B, respectively. Additionally, the plurality of first teeth 219*a* may be a first length, or height, and the plurality of second teeth 219*b* may be a second length, or height, different (e.g., longer) from the first length. In some configurations, first teeth 219*a* and second teeth 219*b* may alternate.

Figure 2D:
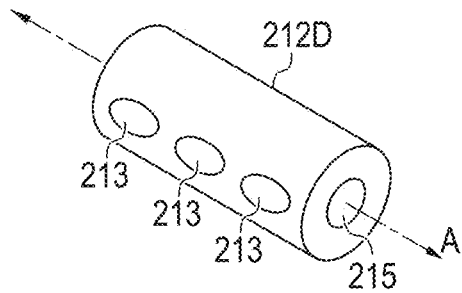

FIG. 2D illustrates a portion 212D of second arm 113*b* of first loop 112*a* and/or second arm 111*b* of second loop 112*b* shown in FIGS. 1A-1C having, for example, a plurality of holes 213. The plurality of holes 213 may be in fluid connection with a lumen 215 extending through a center of portion 212D, for example, along longitudinal axis A. The plurality of holes 213 may be circular, ovular (as shown), rectangular, square, or otherwise shaped and sized to facilitate sufficient suction, irrigation, and/or insufflation. Additionally or alternatively, the plurality of holes 213 may each be the same size and/or shape, or may be different sizes and/or shapes. Accordingly, the plurality of holes 213 and lumen 215 may be used to facilitate suction, insufflation, and/or irrigation along a length of each of first loop 112*a* and/or second loop 112*b*. For example, suction may be used to help grip or otherwise retain tissue or objects between each of first loop 112*a* and/or second loop 112*b*. Irrigation or insufflation may be used to assist in flushing or removing tissue or objects caught, stuck, or trapped to first loop 112*a* and/or second loop 112*b*.

Figure 2E:
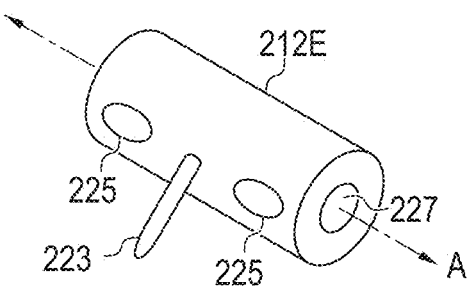

FIG. 2E illustrates an alternative portion 212E of first loop 112*a* and/or second loop 112*b* shown in FIGS. 1A-1C having, for example, a plurality of holes 225 and a plurality of teeth 223. Although only one tooth of the plurality of teeth 223 is shown, it is noted that this configuration may comprise more than one tooth. The plurality of holes 225 may be in fluid connection with a lumen 227 extending through a center of portion 212E, for example, along longitudinal axis A. The plurality of holes 225 may have any of the characteristics of holes 213 described in relation to FIG. 2D. Similarly, the plurality of teeth 223 may have any of the features or characteristics of the plurality of teeth 218 shown in FIG. 2A, the plurality of first teeth 217*a* and the plurality of second teeth 217*b* shown in FIG. 2B, and/or the plurality of first teeth 219*a* and the plurality of second teeth 219*b* shown in FIG. 2C.

Figure 3:
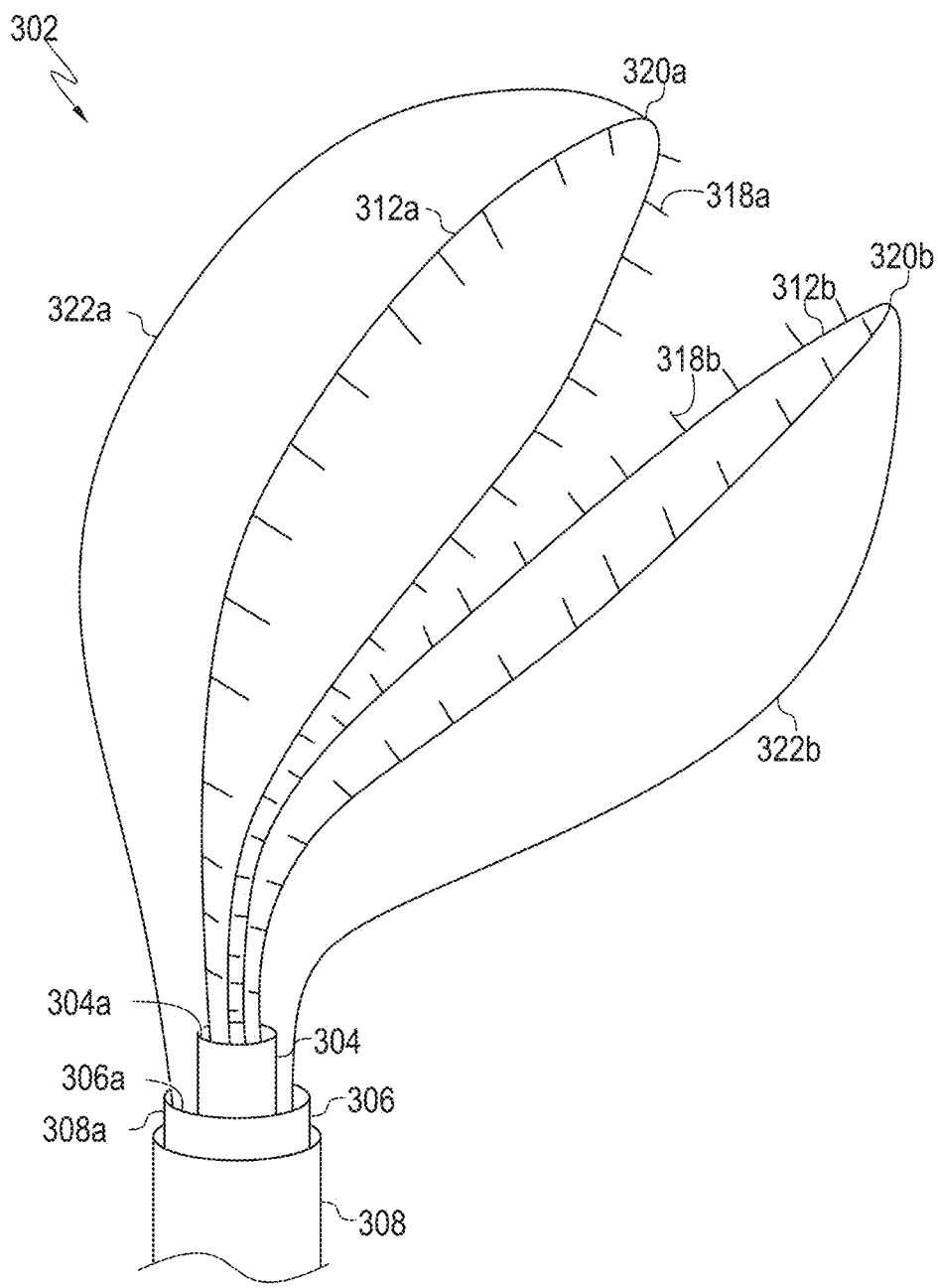
FIG. 3 illustrates a perspective view of an alternative embodiment of a distal portion, according to aspects of this disclosure.

FIG. 3 illustrates a perspective view of an alternative distal portion 302 in a first (e.g., open or extended) configuration. Distal portion 302 may be controlled by, for example, handle 101 shown in FIG. 1A. Additionally, distal portion 302 may have any of the characteristics of distal portion 102, except as described below.

Distal portion 302 includes an internal sheath 304, an intermediate sheath 306, and an external sheath 308. Internal sheath 304, intermediate sheath 306, and external sheath 308 may each be formed by a coil, a tube, a sheath, etc., and may have an internal lumen (not shown) extending longitudinally. For example, an internal lumen of external sheath 308 may be sized and shaped to receive intermediate sheath 306. Similarly, an internal lumen of intermediate sheath 306 may be sized and shaped to receive internal sheath 304. An internal lumen of internal sheath 304 may be sized and shaped to receive additional auxiliary devices (e.g., a guidewire, a basket, a grasper, forceps, etc.). Additionally or alternatively, the internal lumen of internal sheath 304 may be used for irrigation, suction, and/or insufflation. In alternative configurations, internal sheath 304 may be formed of a wire or a solid sheath, for example, without an internal lumen.

Each of internal sheath 304, intermediate sheath 306, and external sheath 308 may be movable relative to one another. For example, internal sheath 304 may be independently movable relative to intermediate sheath 306, and external sheath 308 may be independently movable relative to external sheath 308.

Distal portion 302 further comprises a first wire 322*a* and a second wire 322*b*. Each of first wire 322*a* and second wire 322*b* may be a wire, a tube, a ribbon, etc. Additionally, first wire 322*a* and second wire 322*b* may be formed of one or more flexible or semi-flexible materials, for example, including expandable and/or shape-memory characteristics, such as, for example, plastic, Nitinol, Nickel-cobalt, stainless steel, or any material(s) commonly known in the art. First wire 322*a* and second wire 322*b* may be formed of the same material or may be formed of different materials. For example, first wire 322*a* may be formed of plastic, and second wire 322*b* may be formed of Nitinol, or vice versa. Many other combinations are also contemplated.

A proximal portion of each first wire 322*a* and second wire 322*b* may be fixedly coupled to an external or internal surface of intermediate sheath 306 at one or more coupling joint(s) (not shown). One or more crimp(s), adhesive(s), heat shrink(s), weld(s), or any other securing mechanism commonly known in the art may be used to couple the proximal portions of each of first wire 322*a* and second wire 322*b*.

Distal portions of each first wire 322*a* and second wire 322*b* may be coupled to a first loop 312*a* and a second loop 312*b*, respectively, for example, at a first distalmost point 320*a* and second distalmost point 320*b*, respectively. One or more crimp(s), adhesive(s), heat shrink(s), weld(s), or any other securing mechanism commonly known in the art may be used to couple first wire 322*a* and second wire 322*b* to first loop 312*a* and second loop 312*b*, respectively.

Each of first loop 312*a* and second loop 312*b* may be a wire, a tube, a ribbon, etc. Additionally, first loop 312*a* and second loop 312*b* may be formed of one or more flexible or semi-flexible materials, for example, including expandable and/or shape-memory characteristics, such as, for example, plastic, Nitinol, Nickel-cobalt, stainless steel, or any material(s) commonly known in the art. First loop 312*a* and second loop 312*b* may be formed of the same material or may be formed of different materials. For example, first loop 312*a* may be formed of plastic and second loop 312*b* may be formed of Nitinol, or vice versa. Many other combinations are also contemplated.

Proximal portion(s) of each first loop 312*a* and second loop 312*b* may be fixedly coupled to internal sheath 304, for example, by one or more crimp(s), adhesive(s), heat shrink(s), weld(s), or any other securing mechanism commonly known in the art. In alternative configurations, each first loop 312*a* and second loop 312*b* may extend within internal sheath 304. In some configurations, the proximal ends of each of first loop 312*a* and second loop 312*b* may terminate where first loop 312*a* and second loop 312*b* are coupled to internal sheath 304. Alternatively, first loop 312*a* and second loop 312*b* may be secured or coupled to internal sheath 304 and continue to extend proximally. For example, first loop 312*a* and second loop 312*b* may extend into and/or couple to a portion of the handle (not shown).

Portions of first loop 312*a* and second loop 312*b* may comprise a plurality of first teeth 318*a* and a plurality of second teeth 318*b*, respectively. For example, the first teeth 318*a* and second teeth 318*b* may extend radially outwards from first loop 312*a* and second loop 312*b*, respectively. The plurality of first teeth 318*a* may extend along a length of first loop 312*a*, for example, between the point at which the first loop 312*a* is coupled to internal sheath 304 and first distalmost point 320*a*. Similarly, the plurality of second teeth 318*b* may extend along a length of second loop 312*b*, for example, between the point at which the second loop 312b is coupled to internal sheath 304 and second distalmost point 320b. The plurality of first teeth 318a and the plurality of second teeth 318b may shaped or formed to facilitate a better grasp on tissue or other bodily or foreign materials or objects. FIGS. 2A-2E, as described in further detail above, illustrate a variety of configurations for each of the plurality of first teeth 318a and the plurality of second teeth 318b. For example, the spacing between each of the plurality of first teeth 318a and the plurality of second teeth 318b may vary.

FIG. 3 shows distal portion 302 in a first (e.g., open and/or expanded) configuration. In the first configuration, distal end 304a of internal sheath 304 may be distal to distal end 306a of intermediate sheath 306. Additionally, distal end 306a of intermediate sheath 306 may be distal to a distal end 308a of external sheath 308. For example, in the first configuration, at least a portion of first wire 322a, first loop 312a, second wire 322b of second loop 312b of distal portion 302 may no longer be confined by external sheath 308. Accordingly, each of first loop 312a, second loop 312b, first wire 322a, and second wire 322b may push radially outward.

In the first configuration, a user may extend or retract internal sheath 304 and/or extend or retract intermediate sheath 306 relative to external sheath 308. For example, internal sheath 304 may be extended and/or retracted such that the plurality of first teeth 318a and the plurality of second teeth 318b move towards one another or away from one another. This action may be similar to jaws opening and/or closing. This movement may help distal portion 302 to grasp on to and/or hold tissue or other bodily or foreign materials between first loop 312a and second loop 312b. In some configurations, internal sheath 304 may be pulled or retracted proximally such that distal end 304a of internal sheath 304 is proximal to distal end 306a of intermediate sheath 306. This movement may help to enable a firmer or more secure grip on the grasped tissue or other bodily or foreign materials. Accordingly, distal portion 302 may be used in a similar manner to distal portion 102 described in FIGS. 1A-1C.

Figure 4:
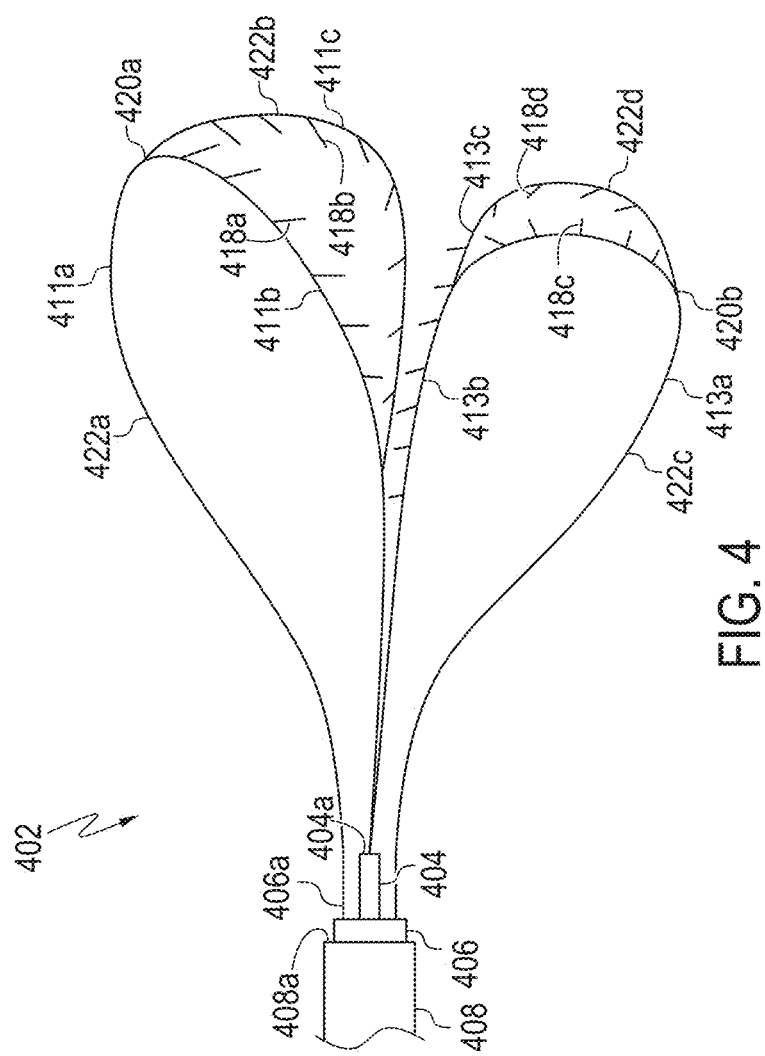
FIG. 4 illustrates a perspective view of another alternative embodiment of a distal end, according to aspects of this disclosure.

FIG. 4 illustrates a perspective view of an alternative distal portion 402 in a first (e.g., open and/or extended) configuration. Distal portion 402 may be controlled by, for example, handle 101 shown in FIG. 1A. Additionally, distal portion 402 may have any of the characteristics of distal portion 102 and/or distal portion 302, except as described below. For example, distal portion 402 may comprise an internal sheath 404, an intermediate sheath 406, and an external sheath 408. Distal portion 402 further comprises a first loop 422a, a second loop 422b, a third loop 422c, and a fourth loop 422d. First loop 422a may be coupled to second loop 422b, for example at a first joint 420a. Similarly, third loop 422c may be coupled to fourth loop 422d, for example at a second joint 420b.

First loop 422a may further comprise a first arm 411a and a second arm 411b. Second loop 422b may be further comprised of the same first arm 411a comprising first loop 422a and a second arm 411c. For example, first arm 411a may be comprised of one wire that splits at first joint 420a. Alternatively, first arm 411a may be comprised of multiple wires. For example, one wire may comprise first arm 411a of first loop 422a and another wire may comprise first arm 411a of second loop 422b. In such a configuration, each of the wires comprising first arm 411a may be coupled at first joint 420a.

Similarly, third loop 422c may further comprise a first arm 413a and a second arm 413b. Fourth loop 422d may be further comprised of the same first arm 413a comprising third loop 422c and a second arm 413c. For example, first arm 411a may be comprised of one wire that splits at second joint 420b. Alternatively, first arm 413a may be comprised of multiple wires. For example, one wire may comprise first arm 413a of third loop 422c and another wire may comprise first arm 413a of fourth loop 422d. In such a configuration, each of the wires comprising first arm 413a may be coupled at second joint 420b.

Proximal ends of each of second arm 411b of first loop 422a, second arm 411c of second loop 422b, second arm 413b of third loop 422c, and second arm 413c of fourth loop 422d may be coupled to intermediate sheath 406, for example, by one or more crimp(s), adhesive(s), heat shrink(s), weld(s), or any other securing mechanism commonly known in the art. Similarly, proximal ends of each of first arm 411a of first loop 422a and second loop 422b, and first arm 413a of third loop 422c and fourth loop 422d may be coupled to internal sheath 404, for example, by one or more crimp(s), adhesive(s), heat shrink(s), weld(s), or any other securing mechanism commonly known in the art.

Portions of first loop 422a, second loop 422b, third loop 422c, and fourth loop 422d may comprise a plurality of first teeth 418a, a plurality of second teeth 418b, a plurality of third teeth 418c, and a plurality of fourth teeth 418d, respectively. For example, first teeth 418a, second teeth 418b, third teeth 418c, and fourth teeth 418d may extend radially outwards from first loop 422a, second loop 422b, third loop 422c, and fourth loop 422d, respectively. The plurality of first teeth 418a may extend along a length of first loop 422a, for example, between the point at which the first loop 422a is coupled to internal sheath 404 and first joint 420a. Similarly, the plurality of second teeth 418b may extend along a length of second loop 422b, for example, between the point at which the second loop 422b is coupled to internal sheath 404 and second joint 420b. The plurality of third teeth 418c and fourth teeth 418d may extend along a length of third loop 422c and fourth loop 422d, respectively, for example, between the point at which the third loop 422c and fourth loop 422d are coupled to internal sheath 404 and second joint 420b.

The plurality of first teeth 418a, second teeth 418b, third teeth 418c, and fourth teeth 418d may shaped or formed to help grasp on tissue or other bodily or foreign materials. FIGS. 2A-2E, described in further detail above, illustrate a variety of configurations for each of the plurality of first teeth 418a, second teeth 418b, third teeth 418c, and fourth teeth 418d.

FIG. 4 shows distal portion 402 in a first (e.g., open and/or expanded) configuration. In the first configuration, distal end 404a of internal sheath 404 may be distal to distal end 406a of intermediate sheath 406. Additionally, distal end 406a of intermediate sheath 406 may be distal to a distal end 408a of external sheath 408. For example, in the first configuration, at least a portion of distal portion 402 may no longer be confined by external sheath 408. Accordingly, each of first loop 422a, second loop 422b, third loop 422c, and fourth loop 422d may push radially outward.

In the first configuration, a user may extend or retract internal sheath 404 and/or extend or retract intermediate sheath 406 relative to external sheath 408. For example, internal sheath 404 may be extended and/or retracted such that the plurality of first teeth 418a and second teeth 418b and the plurality of third teeth 418c and fourth teeth 418d move towards one another or away from one another. This action may be similar to jaws opening and/or closing. This movement may help distal portion 402 to grasp on to and/or hold tissue or other bodily or foreign materials between each of first loop 422a, second loop 422b, third loop 422c, and fourth loop 422d. In some configurations, internal sheath 404 may be pulled proximally such that distal end 404a of internal sheath 404 is proximal to distal end 406a of intermediate sheath 406. This configuration may enable a firmer or more secure grip on the grasped tissue or other bodily or foreign materials. Accordingly, distal portion 402 may be used in a similar manner to distal portion 102 and distal portion 302 described in FIGS. 1A-1C and FIG. 3, respectively.

Figure 5:
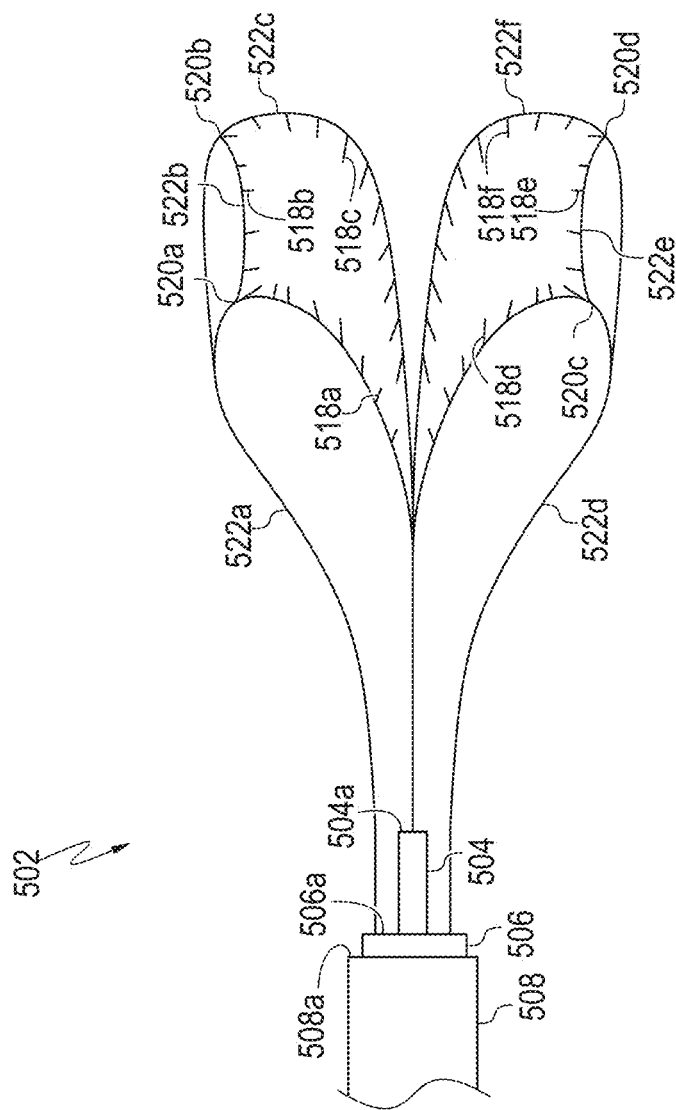
FIG. 5 illustrates a perspective view of yet another alternative embodiment of a distal end, according to aspects of this disclosure.

FIG. 5 illustrates a perspective view of an alternative distal portion 502 in a first (e.g., open and/or extended) configuration. Distal portion 502 may be controlled by, for example, handle 101 shown in FIG. 1A. Additionally, distal portion 502 may have any of the characteristics of distal portion 402 described in relation to FIG. 4, except as described below. For example, distal portion 502 may comprise an internal sheath 504, an intermediate sheath 506, and an external sheath 508. Distal portion 502 further comprises a first loop 522a, a second loop 522b, a third loop 522c, a fourth loop 522d, a fifth loop 522e, and a sixth loop 522f. Second loop 522b may be coupled to first loop 522a and third loop 522c. For example, second loop 522b may be positioned and/or extend between first loop 522a and third loop 522c. Second loop 522b may be coupled to first loop 522a at a first joint 520a. Additionally, second loop 522b may be coupled to third loop 522c at a second joint 520b. In some configurations, second loop 522b may terminate at each of first joint 520a and second joint 520b. For example, second loop 522b may be a discrete length of wire extending between first joint 520a and second joint 520b. Alternatively, the proximal ends of second loop 522b may extend proximally along with a proximal end of first loop 522a and a proximal end of third loop 522c.

Similarly, fifth loop 522e may be positioned and/or extend between fourth loop 522d and sixth loop 522f. For example, fifth loop 522e may be coupled to fourth loop 522d and sixth loop 522f. Additionally, fifth loop 522e may be coupled to sixth loop 522f at a fourth joint 520d. In some configurations, fifth loop 522e may terminate at each of third joint 520c and fourth joint 520d. For example, fifth loop 522e may be a discrete length of wire extending between third joint 520c and fourth joint 520d. Alternatively, the proximal ends of fifth loop 522e may extend proximally along with a proximal end of fourth loop 522d and a proximal end of sixth loop 522f.

A first end of each of first loop 522a, third loop 522c, fourth loop 522d, and sixth loop 522f may be coupled to intermediate sheath 506, for example, by one or more crimp(s), adhesive(s), heat shrink(s), weld(s), or any other securing mechanism commonly known in the art. Each end of second loop 522b and fifth loop 522e may be coupled to intermediate sheath 506, for example, by one or more crimp(s), adhesive(s), heat shrink(s), weld(s), or any other securing mechanism commonly known in the art. Similarly, a second end of each of first loop 522a, third loop 522c, fourth loop 522d, and sixth loop 522f may be coupled to internal sheath 504, for example, by one or more crimp(s), adhesive(s), heat shrink(s), weld(s), or any other securing mechanism commonly known in the art.

Portions of first loop 522a, second loop 522b, third loop 522c, fourth loop 522d, fifth loop 522e, and sixth loop 522f may comprise a plurality of first teeth 518a, a plurality of second teeth 518b, a plurality of third teeth 518c, a plurality of fourth teeth 518d, a plurality of fifth teeth 518e, and a plurality of sixth teeth 518f, respectively. For example, first teeth 518a, second teeth 518b, third teeth 518c, fourth teeth 518d, fifth teeth 518e, and sixth teeth 518f may extend radially outwards from first loop 522a, second loop 522b, third loop 522c, fourth loop 522d, fifth loop 522e, and sixth loop 522f, respectively. The plurality of first teeth 518a may extend along a length of first loop 522a, for example, between the point at which the first loop 522a is coupled to internal sheath 504 and first joint 520a. Similarly, the plurality of third teeth 518c may extend along a length of third loop 522c, for example, between the point at which the third loop 522c is coupled to internal sheath 504 and second joint 520b. The plurality of second teeth 518b may extend along the length of second loop 522b, for example, between first joint 520a and second joint 520b. The plurality of fourth teeth 518d may extend along a length of fourth loop 522d, for example, between the point at which the fourth loop 522d is coupled to internal sheath 504 and third joint 520c. Similarly, the plurality of sixth teeth 518f may extend along a length of sixth loop 522f, for example, between the point at which the sixth loop 522f is coupled to internal sheath 504 and fourth joint 520d. The plurality of fifth teeth 518e may extend along the length of fifth loop 522e, for example, between third joint 520c and fourth joint 520d. In some configurations, each of the plurality of first teeth 518a, second teeth 518b, third teeth 518c, fourth teeth 518d, fifth teeth 518e, and sixth teeth 518f may be only on distal portions of each of first loop 522a, second loop 522b, third loop 522c, fourth loop 522d, fifth loop 522e, and sixth loop 522f, respectively.

The plurality of first teeth 518a, second teeth 518b, third teeth 518c, fourth teeth 518d, fifth teeth 518e, and sixth teeth 518f may shaped or formed to facilitate a better grasp on tissue or other bodily or foreign materials. FIGS. 2A-2E, described in further detail above, illustrate a variety of configurations for each of the plurality of first teeth 518a, the plurality of second teeth 518b, the plurality of third teeth 518c, the plurality of fourth teeth 518d, the plurality of fifth teeth 518e, and the plurality of sixth teeth 518f.

FIG. 5 shows distal portion 502 in a first (e.g., open and or expanded) configuration. In the first configuration, distal end 504a of internal sheath 504 may be distal to distal end 506a of intermediate sheath 506. Additionally, distal end 506a of intermediate sheath 506 may be distal to a distal end 508a of external sheath 508. For example, in the first configuration, at least a portion of distal portion 502 may no longer be confined by external sheath 508. Accordingly, each of first loop 522a, second loop 522b, third loop 522c, fourth loop 522d, fifth loop 522e, and sixth loop 522f may push and/or be biased radially outward.

In the first configuration, a user may extend or retract internal sheath 504 and/or extend or retract intermediate sheath 506 relative to external sheath 408. For example, internal sheath 504 may be extended and/or retracted such that the plurality of first teeth 518a, second teeth 518b, and third teeth 518c and the plurality of fourth teeth 518d, fifth teeth 518e, and sixth teeth 518f move towards one another or away from one another. This action may be similar to jaws opening and/or closing. This movement may help to enable distal portion 502 to grasp on to and/or hold tissue or other bodily or foreign materials between each of first loop 522a, second loop 522b, third loop 522c, fourth loop 522d, fifth loop 522e, and sixth loop 522f. In some configurations, internal sheath 504 may be pulled or retracted proximally such that distal end 504a of internal sheath 504 is proximal to distal end 506a of intermediate sheath 506. This configuration may help to provide a firmer or more secure grip on the grasped tissue or other bodily or foreign materials. Accordingly, distal portion 502 may be used in a similar manner to distal portion 102 and distal portion 402 described in FIGS. 1A-1C and FIG. 4, respectively.

Figure 6:
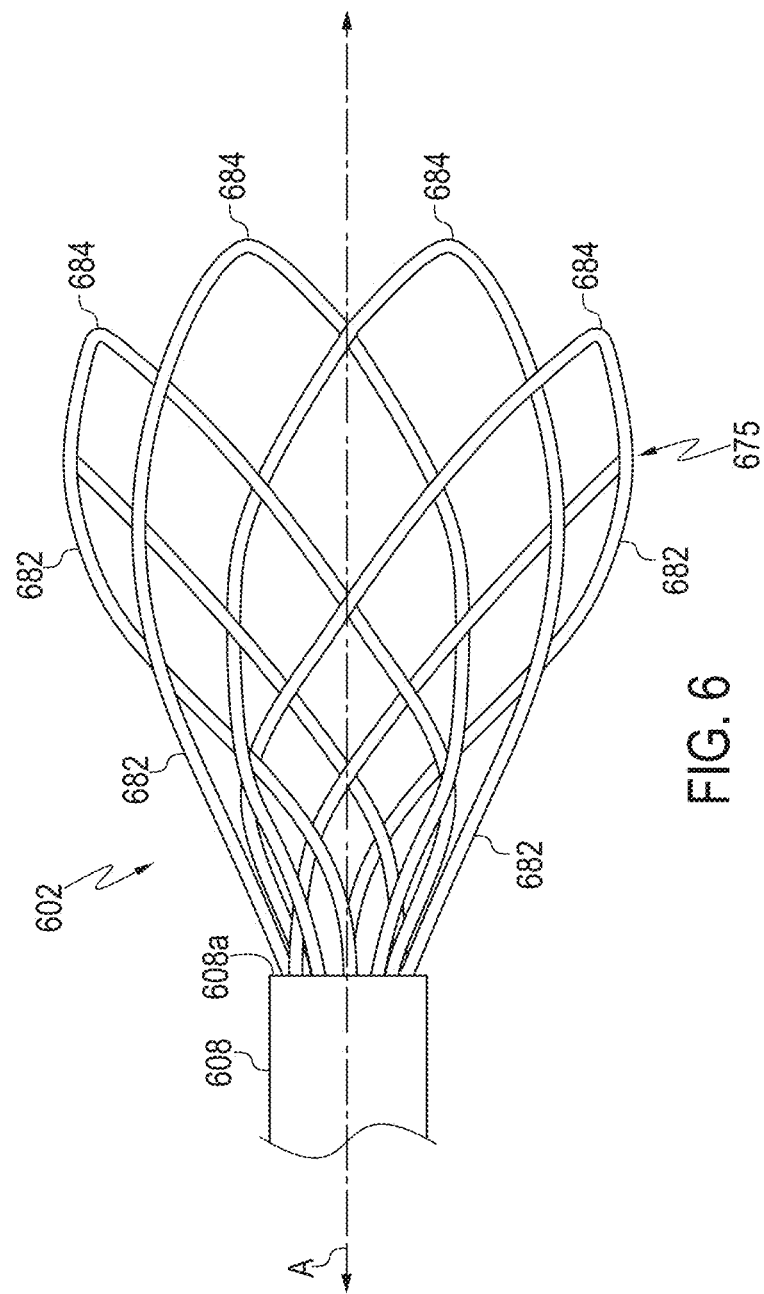
FIG. 6 illustrates a perspective view of an alternative embodiment of a distal end, according to aspects of this disclosure.

FIG. 6 illustrates a perspective view of an alternative distal portion 602 in a first (e.g., open or extended) configuration. Distal portion 602 may be controlled by, for example, handle 101 shown in FIG. 1A. Distal portion 602 may comprise an external sheath 608 and a grasper 675. Grasper 675 may be comprised of a plurality of wires 682 woven together and/or at least partially overlapping. Each of the plurality of wires 682 may be formed of a shape-memory material and may be biased outwards, for example, away from a longitudinal axis A. Each of the plurality of wires 682 may be comprised of a shape-memory material, such as, for example, plastic, Nitinol, Nickel-cobalt, stainless steel, or any material(s) commonly known in the art. Additionally, each of the plurality of wires 682 may form a distal end 684. Although not shown, a proximal end of grasper 675 may be coupled to an internal sheath by one or more crimp(s), adhesive(s), heat shrink(s), weld(s), or any other securing mechanism commonly known in the art. The internal sheath may be moveable relative to external sheath 608. Accordingly, as the internal sheath is extended proximally such that grasper 675 is distal to a distalmost end 608a of external sheath 608, the plurality of wires 682 may expand or extend radially outward.

Distal portion 602 may be delivered into the body in a retracted position (not shown), for example, with grasper 675 positioned within external sheath 608. In the retracted position, for example, each of distal ends 684 of grasper 675 may be proximal or adjacent to distalmost end 608a of external sheath 608. A user may then direct distal portion 602 to an intended target site by various techniques, including imaging. Once a target site is reached, a user may position distal portion 602 such that distal portion 602 is over/facing the tissue or object that is targeted for removal. A user may then extend or release distal portion 602, for example, to the first configuration shown in FIG. 6. A user may then pull or retract the internal sheath coupled to grasper 675 proximally. As the grasper is pulled or retracted proximally, a cross-sectional width of grasper 675 may decrease. Accordingly, grasper 675 may close around the tissue or object that is targeted for removal. Consequently, the targeted tissue or object may be at least partially secured or held by grasper 675 so that the targeted tissue may be fragmented, dislodged, removed, and/or held within grasper 675. After obtaining the targeted tissue or object, a user may direct distal portion 602 to an appropriate site for dispensing the tissue or object, for example, by retracting the endoscope or retracting distal portion 602 proximally (e.g., the stomach), and expanding distal portion 602 to dispense or release the tissue or object. A user may then extend internal sheath (not shown) to open distal portion 602, for example, to release the grasped tissue or object. The procedure may be repeated, as necessary, for example, until complete debridement is achieved. Alternatively, a user may remove the grasper 675 from the body while the grasper 675 is closed around and/or at least partially surrounds the targeted tissue or object and may re-insert distal portion 602 to repeat the procedure.

It will be apparent to those skilled in the art that various modifications and variations can be made to the disclosed device without departing from the scope of the disclosure. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

We claim:

1. A medical device comprising:
a handle including a stationary body, a first movable body, and a second movable body;
a control member coupled to the second movable body;
an intermediate sheath coupled to the first movable body, wherein the intermediate sheath includes a lumen, wherein the control member is disposed within the lumen of the intermediate sheath, wherein the control member is movable relative to the intermediate sheath;
an external sheath coupled to the stationary body, wherein the external sheath includes a lumen, and wherein the intermediate sheath is disposed within the lumen of the external sheath, wherein the intermediate sheath is movable relative to the external sheath; and
an end effector, wherein the end effector includes a first loop and a second loop,
wherein the first loop includes a first arm and a second arm, wherein the first arm is coupled to the intermediate sheath, wherein the second arm is coupled to the control member, and wherein the second arm includes a first plurality of teeth, and
wherein the second loop includes a third arm and a fourth arm, wherein the third arm is coupled to the intermediate sheath, wherein the fourth arm is coupled to the control member, and wherein the fourth arm includes a second plurality of teeth.

2. The medical device of claim 1, wherein the first plurality of teeth is on a distal portion of the second arm, and wherein the second plurality of teeth is on a distal portion of the fourth arm.

3. The medical device of claim 1, wherein the first plurality of teeth includes a plurality of first teeth and a plurality of second teeth, wherein the plurality of first teeth are arranged at a different angle than the plurality of second teeth, and
wherein the second plurality of teeth includes a plurality of third teeth and a plurality of fourth teeth, wherein the plurality of third teeth are arranged at a different angle than the plurality of fourth teeth.

4. The medical device of claim 1, wherein the first plurality of teeth includes a plurality of first teeth and a plurality of second teeth, wherein the plurality of first teeth have a first height and the plurality of second teeth have a second height different than the first height, and
wherein the second plurality of teeth includes a plurality of third teeth and a plurality of fourth teeth, wherein the plurality of third teeth have a third height and the plurality of fourth teeth have a fourth height different than the third height.

5. The medical device of claim 1, wherein the second arm of the first loop and the fourth arm of the second loop further comprises a plurality of holes, wherein the plurality of holes is in fluid connection with a lumen extending through a center portion of each of the second arm of the first loop and the fourth arm of the second loop.

6. The medical device of claim 1, wherein the first movable body is movably positioned within a slot on the stationary body, and wherein the second movable body is movably positioned within a slot on the first movable body.

7. The medical device of claim 1, wherein each of the first loop and the second loop are formed of a shape-memory material, and wherein each of the first loop and second loop are collapsible within the external sheath.

8. The medical device of claim 1, wherein the control member is an internal sheath having a lumen.

9. The medical device of claim 1, wherein the end effector further comprises a third loop coupled to the first loop at a first joint, and a fourth loop coupled to the second loop at a second joint, wherein the third loop includes a fifth arm and a sixth arm, and the fourth loop includes a seventh arm and an eighth arm, wherein the sixth arm of the third loop includes a plurality of third teeth, and wherein the eighth arm of the fourth loop includes a plurality of fourth teeth.

10. The medical device of claim 9, wherein the fifth arm of the third loop is coupled to the intermediate sheath, wherein the sixth arm of the third loop is coupled to the control member, wherein the seventh arm of the fourth loop is coupled to the intermediate sheath, and wherein the eighth arm of the fourth loop is coupled to the control member.

11. The medical device of claim 9, wherein each of the first loop, the second loop, the third loop, and the fourth loop are formed of a shape-memory material, and wherein each of the first loop, the second loop, the third loop, and the fourth loop are collapsible within the external sheath.

12. The medical device of claim 1, wherein the end effector further comprises a third loop and a fourth loop, wherein the third loop is coupled to the first loop by a first wire, wherein the fourth loop is coupled to the second loop by a second wire.

13. The medical device of claim 12, wherein the third loop includes a fifth arm and a sixth arm, and the fourth loop includes a seventh arm and an eighth arm, wherein the sixth arm of the third loop includes a plurality of third teeth, wherein the sixth arm of the fourth loop includes a plurality of fourth teeth, wherein the first wire includes a plurality of fifth teeth, and wherein the second wire includes a plurality of sixth teeth.

14. The medical device of claim 13, wherein each of the first loop, the second loop, the third loop, the fourth loop, the first wire, and the second wire are formed of a shape-memory material, and wherein each of the first loop, the second loop, the third loop, the fourth loop, the first wire, and the second wire are collapsible within the external sheath.

15. The medical device of claim 1, wherein,
in a first configuration, a distal end of the control member is distal to a distal end of the intermediate sheath, a distal end of the intermediate sheath is distal to a distal end of the external sheath, and the first loop and the second loop are spaced a first distance apart;
in a second configuration, the distal end of the control member is proximal to the distal end of the intermediate sheath, the distal end of the intermediate sheath is distal to the distal end of the external sheath, and the first loop and the second loop are spaced a second distance apart, wherein the second distance is less than the first distance; and
in a third configuration, the distal end of the control member is proximal to the distal end of the intermediate sheath, the distal end of the intermediate sheath is distal to the distal end of the control member and proximal to the distal end of the external sheath, and the first loop and the second loop are spaced a third distance apart, wherein the third distance is less than the second distance.

16. A medical device comprising:
a handle including a stationary body, a first movable body, and a second movable body;
a first sheath coupled to the second movable body;
a second sheath coupled to the first movable body, wherein the first sheath is disposed within a lumen of the second sheath, wherein the first sheath is movable relative to the second sheath;
a third sheath coupled to the stationary body, wherein the second sheath is disposed within a lumen of the third sheath, wherein the second sheath is movable relative to the third sheath; and
an end effector, wherein the end effector includes:
a first loop, wherein a first proximal end of the first loop is coupled to the first sheath, wherein a second proximal end of the first loop is coupled to the second sheath, wherein at least a portion of the first loop includes a first plurality of teeth extending radially inward; and
a second loop, wherein a first proximal end of the second loop is coupled to the first sheath, wherein a second proximal end of the second loop is coupled to the second sheath, wherein at least a portion of the second loop includes a second plurality of teeth extending inward,
wherein distal movement of the first movable body extends a first portion of the first loop and a first portion of the second loop, and wherein proximal movement of the first movable body retracts the first portion of the first loop and the first portion of the second loop, and
wherein distal movement of the second movable body extends a second portion of the first loop and a second portion of the second loop, and wherein proximal movement of the second movable body retracts the second portion of the first loop and the second portion of the second loop.

17. The medical device of claim 16, wherein the first plurality of teeth includes a plurality of first teeth and a plurality of second teeth, wherein the plurality of first teeth are arranged at a different angle than the plurality of second teeth, and
wherein the second plurality of teeth includes a plurality of third teeth and a plurality of fourth teeth, wherein the plurality of third teeth are arranged at a different angle than the plurality of fourth teeth.

18. The medical device of claim 16, wherein the first plurality of teeth includes a plurality of first teeth and a plurality of second teeth, wherein the plurality of first teeth have a first height, and wherein the plurality of second teeth have a second height different than the first height, and
wherein the second plurality of teeth includes a plurality of third teeth and a plurality of fourth teeth, wherein the plurality of third teeth have a third height, and wherein the plurality of fourth teeth have a fourth height different than the third height.

19. An end effector comprising:
a first sheath;
a second sheath, wherein the first sheath is disposed within a lumen of the second sheath, wherein the first sheath is movable relative to the second sheath;
a third sheath, wherein the second sheath is disposed within a lumen of the third sheath, wherein the second sheath is movable relative to the third sheath;
a first loop, wherein the first loop includes a first arm and a second arm, wherein the first arm of the first loop is coupled to the second sheath, wherein the second arm of the first loop is coupled to the first sheath, wherein the second arm includes a first plurality of teeth; and
a second loop, wherein the second loop includes a first arm and a second arm, wherein the first arm of the second loop is coupled to the second sheath, wherein the second arm of the second loop is coupled to the first sheath, wherein the second arm includes a second plurality of teeth, and wherein each tooth of the first plurality of teeth and each tooth of the second plurality of teeth are equally spaced from an adjacent tooth.

20. The end effector of claim 19, further comprising a third loop coupled to the first loop at a first joint, and a fourth loop coupled to the second loop at a second joint, wherein the third loop and the fourth loop are each comprised of a first arm and a second arm, wherein the second arm of the third loop includes a plurality of third teeth, and wherein the second arm of the fourth loop includes a fourth plurality of teeth.

* * * * *